United States Patent [19]

Bowman

[11] Patent Number: 4,715,966

[45] Date of Patent: Dec. 29, 1987

[54] SEPTIC TANK SLUDGE LEVEL INDICATOR

[75] Inventor: Gary K. Bowman, Springfield, Ohio

[73] Assignee: Ingenuity Unlimited, Inc., Springfield, Ohio

[21] Appl. No.: 802,584

[22] Filed: Nov. 26, 1985

[51] Int. Cl.⁴ .............................................. B01D 21/34
[52] U.S. Cl. ...................... 210/800; 210/86; 210/532.2
[58] Field of Search ............... 210/86, 123, 532.2, 210/800

[56] References Cited

U.S. PATENT DOCUMENTS

| | | | |
|---|---|---|---|
| 3,025,962 | 3/1962 | Williams | 210/86 |
| 3,332,552 | 7/1967 | Zabel | 210/532.2 X |
| 3,954,612 | 5/1976 | Wilkerson | 210/86 |
| 4,319,998 | 3/1982 | Anderson | 210/86 |
| 4,348,278 | 9/1982 | Caccia | 210/86 |

Primary Examiner—Tom Wyse
Attorney, Agent, or Firm—Fleit, Jacobson, Cohn & Price

[57] ABSTRACT

A septic tank sludge level indicator including a float assembly that can be inserted downwardly into a septic tank through a permanently installed introducer tube or access pipe that has an upper end substantially flush with ground surface and provided with a removable cap for insertion and removal of the float. The float is constructed so that it will not be buoyant in a liquid material or floating scum on the upper surface of liquid material normally found in a septic tank but will be supported when the float comes into contact with collected sludge in the bottom portion of the septic tank with the upper end of the float assembly including indicia indicating the depth of sludge in the septic tank thereby providing an indication as to whether the sludge should be pumped from the tank.

9 Claims, 3 Drawing Figures

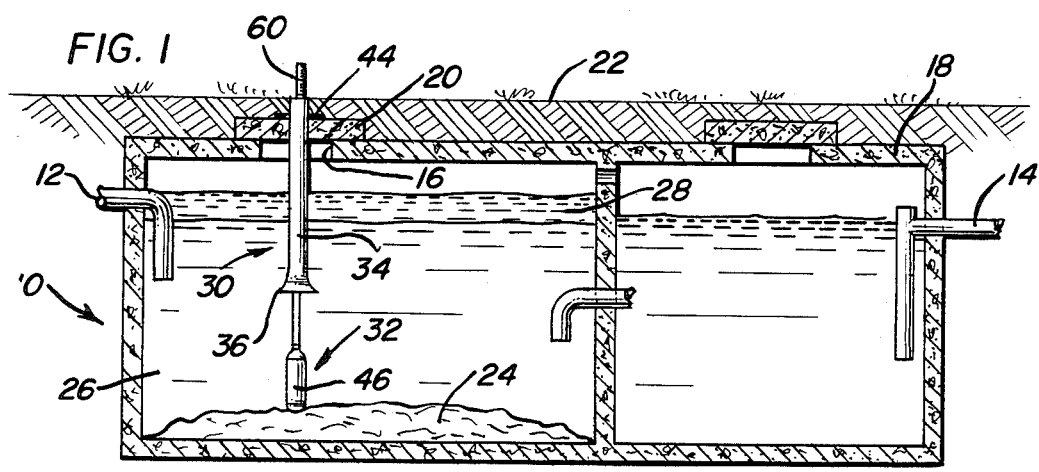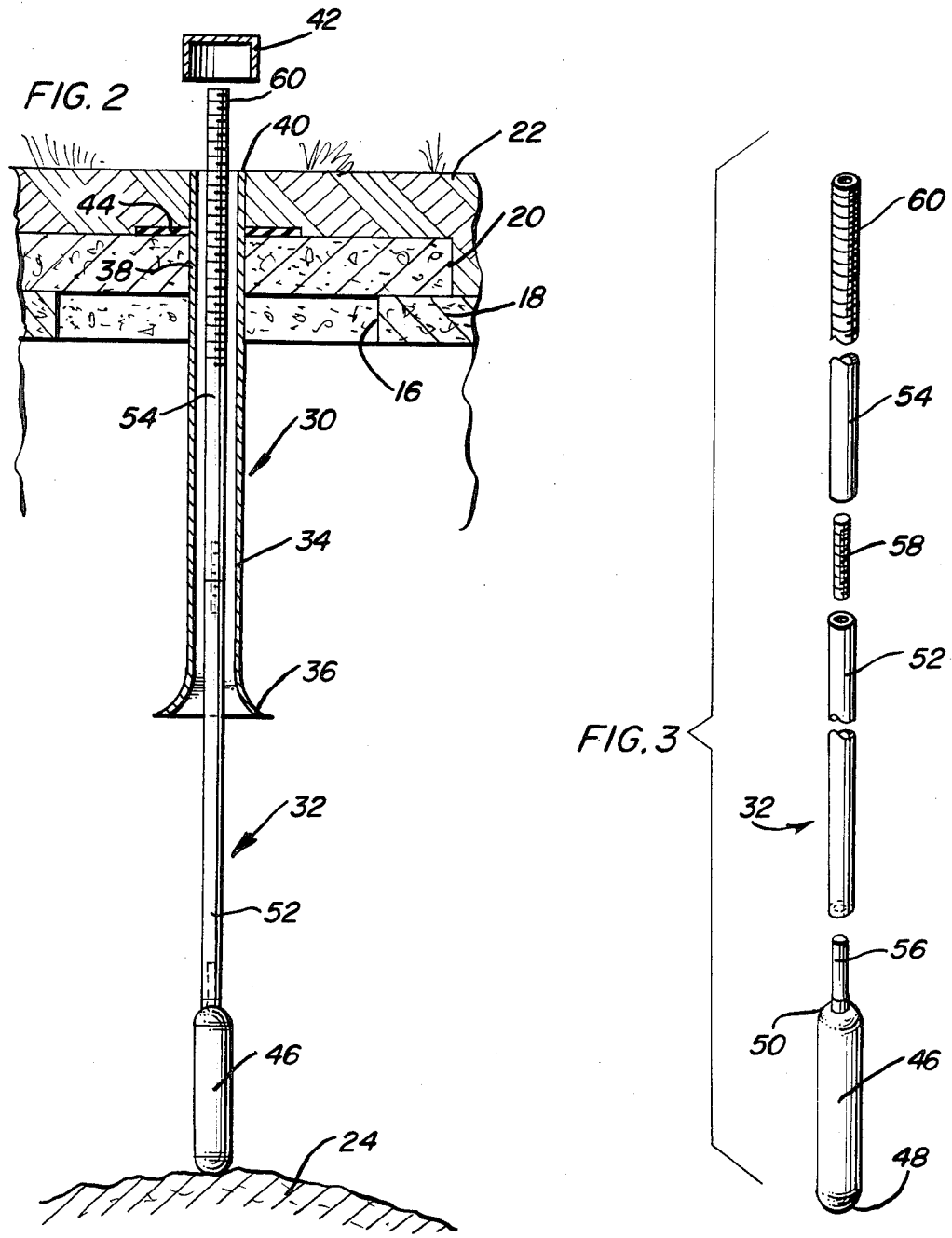

SEPTIC TANK SLUDGE LEVEL INDICATOR

BACKGROUND OF THE INVENTION

1. Field of the Invention

The present invention generally relates to a septic tank sludge level indicator and more specifically a float assembly that can be inserted downwardly into a septic tank through a permanently installed introducer tube or access pipe that has an upper end substantially flush with ground surface and provided with a removable cap for insertion and removal of the float. The float is constructed so that it will not be buoyant in a liquid material or floating scum on the upper surface of liquid material normally found in a septic tank but will be supported when the float comes into contact with collected sludge in the bottom portion of the septic tank with the upper end of the float assembly including indicia indicating the depth of sludge in the septic tank thereby providing an indication as to whether the sludge should be pumped from the tank.

INFORMATION DISCLOSURE STATEMENT

Septic tanks used for sewage disposal must be periodically cleaned in order to prevent solid material such as digested sludge from migrating into the drain field or leach bed. Since it is quite expensive to have the sludge pumped from the septic tank, it is desirable that the elapsed time between septic tank clean-outs be maximized but it is also essential that the level of sludge collected in the septic tank not exceed a predetermined depth in order to prevent the sludge from entering the drain field or leach bed. Various elaborate devices monitoring the sludge level are known but are subject to considerable deterioration due to the environmental conditions encountered interiorally of a septic tank which has resulted in a relatively short dependable lifespan of such devices.

SUMMARY OF THE INVENTION

An object of the present invention is to provide a septic tank sludge level indicator which will provide a dependable indicator for the sludge level in a septic tank and which includes a float assembly insertable into the septic tank and which includes a float member and an elongated tube forming a handle therefor which is constructed so that it will move downwardly through liquid in the septic tank and come to rest on top of and remain supported on top of sludge accumulated on the bottom of the septic tank with the upper end of the tube projecting above ground surface and providing an indicator of the depth of sludge in the septic tank with the float assembly being removed from the tank after determining the depth of sludge and easily stored for periodic check of the sludge depth in the tank.

Another object of the invention is to provide a sludge level indicator in accordance with the preceding object in which the float assembly is insertable into the septic tank through a permanently installed introducer tube or access pipe that can be easily retrofitted into an already installed septic tank or easily installed when a new septic tank is installed in the ground with the introducer tube passing through a hole in the cover or lid normally provided for the access opening in the top of the septic tank with the introducer tube or access pipe having an upper end located generally at ground surface and provided with a removable cap which remains in place until the float assembly is to be inserted for checking the sludge level in the septic tank.

A further object of the invention is to provide a sludge level indicator in accordance with the preceding objects in which the components are constructed of readily available materials that are not subject to deterioration by environmental conditions encountered interiorally of the septic tank and which can be easily inserted and removed and provides an accurate, dependable and long lasting indicator to enable periodic checks to be made of the depth of sludge collected in the bottom of a septic tank to enable the sludge to be removed from the septic tank only when it is necessary to prevent clogging of the drain field or leach bed.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic view illustrating the sludge level indicator of the present invention installed in a conventional septic tank.

FIG. 2 is an enlarged sectional view of the sludge level indicator illustrating the association of the components to the septic tank, access opening lid and ground surface.

FIG. 3 is an exploded group perspective view illustrating the components of the float assembly.

DESCRIPTION OF THE PREFERRED EMBODIMENT

Referring now specifically to the drawings, the reference numeral 10 generally designates a septic tank installed below ground and provided with an inlet pipe or conduit 12 adjacent one end thereof and an outlet 14 communicated with the leach bed or drain field at the other end thereof. The specific structure of the septic tank may vary and is conventional in and of itself since it is provided with the usual access opening or openings 16 in the top wall 18 with the opening 16 being closed by a removable cover or lid 20 that may be provided with a seal to close the opening 16. The septic tank is installed in accordance with local building code requirements at a predetermined depth below ground surface 22 and, as usual, includes digesting sludge 24 collecting in the bottom thereof, liquid material 26 above the sludge 24 and a layer of floating scum 28 on top of the liquid 26. The aforementioned description of the septic tank is conventional and, as is well known, it is desirable to remove the sludge 24 when it reaches a predetermined depth in the bottom of the tank so that solid sludge particles will not be discharged with liquid effluent into the leach bed or drain field which could result in clogging of the leach bed or drain field. Usually, the sludge is pumped from the septic tank when it has reached a depth of approximately one foot although this depth may vary depending upon the dimensional characteristics of the septic tank and the sewage load discharged into the septic tank. Since it is expensive to have service personnel come to the location of the septic tank to pump the sludge therefrom, it is desirable to not remove the sludge until it is necessary but it is also desirable to be able to dependably and accurately measure the depth of the sludge in the septic tank at periodic intervals, such as at six month intervals.

The sludge level indicator of the present invention includes two components, namely, an introducer tube or access pipe generally designated by numeral 30 and a float assembly generally designated by the numeral 32. The introducer tube or access pipe 30 is permanently installed in the septic tank and may be installed therein after the septic tank has been installed in the ground or prior to it being installed in the ground. The introducer tube or access pipe includes an elongated pipe 34 having an outwardly flared lower end 36 and an upper end which extends through the access opening 16 and extends through an opening 38 formed in the cover or lid 20. The pipe 34 extends above the lid 20 so that its upper end 40 is flush with ground surface 22 and a removable cap 42 is placed on the upper end of the pipe 34 to form a closure therefor with the cap also being flush with ground surface 22 and this cap may be frictionally retained in place by engagement with the exterior of the upper end of the pipe 34 or it may be screwthreaded onto the outside or into the inside of the pipe 34 so that in any event, it will be readily and easily removable without disturbing the pipe 34. The exterior of the pipe 34 is sealed in relation to the lid 20 by a diaphragm 44 of rubber or similar material which snugly engages the exterior of the pipe 34 and rests against the upper surface of the lid 20 to preclude migration of surface water between the pipe 34 and the hole 38 in the lid 20. Also, the rubber diaphragm 44 frictionally retains the pipe 34 in vertically adjusted position when the pipe is installed.

When retrofitting the introducer tube or access pipe 30 into an already installed septic tank, it is only necessary to remove the soil to gain access to the lid 20 so that it can be removed and a hole 38 formed therein by using conventional tools and techniques with the hole 38 being sufficient to receive the pipe 34 therethrough. The pipe is inserted through the lid 20 with the flared end 36 downwardly and the diaphragm 44 slipped over the pipe 34 and engaged with the surface of the lid 20 which is then replaced on the top wall 18 in closing relation to the access opening 16. The pipe 34, when installed in this manner would have its upper end 40 above ground surface so that by merely exerting downward pressure on the pipe 34, the upper end 40 may be moved downwardly until it is flush with the ground surface at 22. The removed soil may then be replaced and ground level 22 accurately related to the upper end of the pipe 34 or the pipe 34 can be pushed further downwardly if desired. The cap 42 will be placed on the upper end of the pipe 34 when replacing the soil to prevent entry of soil into the pipe 34 and also to provide a space for the cap 42 so that it can be easily removed and replaced during normal use of the indicator of this invention. The length of the pipe 38 may be varied depending upon the vertical dimensions of the interior of the septic tank. The lower flared end 36 of the pipe 34 should be at least two feet from the bottom of the septic tank 10 and must be below the level of the outlet 14 in order that the level of the sludge 24 will be disposed below the flared lower end 36 of the pipe 34.

The float assembly 32 includes a hollow plastic bulb 46 which may be in the form of a plastic container of cylindrical cross-sectional configuration and having a blunt but yet rounded lower end 48 and a similar rounded upper end 50. Smaller tubes 52 and 54 which may conveniently be four feet in length are connected to the float 46 by a connector 56 which connects the float to the lower tube 52 and a connector 58 which connects the lower tube 52 to the upper tube 54. Here again, the length of the tubes which form a handle for manipulating the float member 46 can be varied depending upon the vertical dimensional characteristics of the septic tank 10. The upper end of the tube 54 is provided with readily observable graduations or other indicia 60 which is associated with the upper end of the pipe 34 or ground level 22 to indicate the effective depth of the sludge 24 in the septic tank 10. The connectors 56 and 58 may be threaded or these components may be constructed of plastic material permanently secured to the tubes and float by solvent adhesive material or the like. The plastic float member 46 along with the tubes 52 and 54 and the connectors 56 and 58 are constructed with a weight compared with the displaceable volume of these components so that these components will descend through the liquid 26 and will not be buoyant in the liquid 26. Thus, when the cap 42 is removed and the float assembly inserted into the introducer tube or access pipe 30, the float assembly will descend down through the pipe 34 and below the flared end 36 and sink slowly in the liquid 26 until the lower end 46 comes into contact with the upper surface of the sludge 24 as illustrated in FIG. 2 with the solid characteristics of the sludge 24 then being sufficient to stop and support the float member 46 and the entire float assembly 32 so that the graduation 60 on the upper end of the float assembly can be "read". With the vertical dimension between the upper surface of the bottom of the septic tank and the upper end of the pipe 34 being known, a mark can be placed on the tubular member 54 to provide a datum point so that when the float is lowered and engages the upper surface of the sludge 24 and is supported thereby, the difference between the datum point and the position of the graduated end of the tube 54 which projects above the upper end 40 of the access pipe 34 can easily be determined thereby indicating the depth of sludge in the septic tank. The vertical dimension between the upper surface of the bottom of the septic tank and ground surface or upper end of the pipe 34 can easily be determined when the septic tank is empty such as when it has just been installed or when it has been pumped out or the float assembly can be forced downwardly through the sludge into contact with the upper surface of the bottom wall of the septic tank. In this event, assuming that the septic tank has been in use for some time, the access pipe 34 would be installed and the initial reading taken would be the distance between the upper surface of the sludge 24 and the upper end 40 of the pipe 34 and a mark would then be made on the graduated scale 60 at the upper end of the tube 54. Then the float assembly can be forced downwardly through the sludge until it engages the upper surface of the bottom wall of the septic tank and another reading taken so that the vertical distance between the two marks will indicate the depth of the sludge and indicate whether the sludge needs to be pumped from the septic tank.

The present invention may be installed in concrete or cementitious septic tanks and also in plastic or fiberglass reinforced plastic septic tanks and various means may be provided for adjustably sealing and retaining the pipe 34 in the hole 38 through the lid 20 so that the upper end is at ground level and the cap 42 may be easily installed or removed. The access pipe 34 may conveniently be four feet long and constructed of polyvinyl chloride with the internal diameter being sufficient to enable free passage of the float member 46 therethrough since the float assembly is removed after the depth of sludge in the tank has been indicated with the flared end 36 guiding the float member up through the access pipe 34. Alternatively, the flaired end 36 may be omitted so that a standard length of conventional pipe can be employed. While dimensions may vary, the outside diameter of the float member 46 may be slightly less than an inch with the inside diameter of the pipe 34 being slightly greater than the outside diameter of the float member. Also, the float member may be approximately four inches in length with the tubes 52 and 54 being approximately one-half inch in outside diameter to provide sufficient strength and rigidity but yet an easily handled assembly. Since the float assembly is removed from the septic tank, it is not deteriorated by the environmental conditions within the septic tank and the float member is easily cleaned and stored for subsequent periodic use.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A septic tank sludge level indicator comprising an elongated hollow member adapted to extend through the top wall of a septic tank with the lower end thereof oriented in liquid material in the tank and the upper end thereof oriented substantially at ground level and a float assembly inserted through the hollow member from the upper end thereof and adapted to be inserted into the interior of the septic tank and into engagement with the upper surface of sludge collected in the bottom of the septic tank, said float assembly including a float member and an elongated indicator member extending above the upper end of the hollow member with the float assembly being of sufficient weight not to be buoyant in the liquid but adapted to be supported by and stopped by the upper surface of the sludge to enable the depth of sludge in the septic tank to be determined.

2. The indicator as defined in claim 1 wherein said hollow member is in the form of a tubular pipe and said float member including a hollow member of generally cylindrical cross-sectional configuration having an outside diameter slightly less than the inside diameter of the pipe with the upper and lower ends of the float member being rounded to facilitate movement thereof through the pipe.

3. The indicator as defined in claim 2 wherein the lower end of the pipe is outwardly flared to facilitate movement of the float into the lower end of the pipe.

4. The indicator as defined in claim 2 together with means supporting the pipe adjustably and sealingly in relation to the septic tank.

5. In combination, a septic tank having a top wall and means enabling removal of sludge collected on the bottom of the tank, and a sludge level indicator comprising an elongated hollow member extending downwardly through the top wall of the septic tank with the lower end thereof oriented in liquid material in the tank and the upper end thereof oriented substantially at ground level and an indicator assembly inserted through the hollow member from the upper end thereof into the interior of the septic tank and into engagement with the upper surface of sludge collected in the bottom of the septic tank, said assembly including an elongated indicator member extending above the upper end of the hollow member and including indicia thereon associated with the upper end of the hollow member to indicate the elevation of the upper surface of the sludge in the septic tank.

6. The combination as defined in claim 5 wherein said elongated indicator member includes a float member on the lower end thereof with the elongated indicator member and float member being of sufficient weight not to be buoyant in the liquid but be supported by and stopped by the upper surface of the sludge to enable the depth of sludge in the septic tank to be determined.

7. The combination as defined in claim 6 wherein said elongated hollow member includes a removable closure cap to close the upper end thereof when the indicator assembly is removed from the septic tank.

8. The combination as defined in claim 7 wherein said means enabling removal of the sludge includes an access opening in the top wall and a closure lid therefor, said hollow member extending through the lid, and means sealingly and adjustably mounting the hollow member through the lid to enable the hollow member to be adjusted vertically so that the upper end is substantially flush with ground surface.

9. The method of determining the vertical depth of accumulated sludge in the bottom portion of a septic tank in order to enable accumulation of the sludge to a maximum safe vertical depth before removing the sludge from the tank by providing a visual indication of the depth of sludge in the tank at a point above ground level to enable determination of the sludge depth from a point above ground level, said method consisting of the steps of providing a tubular guide through the top wall of the septic tank with the upper end of the guide being substantially at ground level and the lower end of the guide being above the upper surface of the sludge when at its maximum safe depth, inserting an elongated indicator member downwardly into the guide with the indicator member including indica thereon associated with the upper end of the guide to indicate the depth of insertion of the indicator member into the guide and providing the lower end of the indicator member with means thereon engaged with the upper surface of the sludge with the weight of the indicator member and said means on the lower end thereof and the configuration of the means on the lower end thereof enabling the indicator member and means on the lower end thereof to be supported from the upper surface of the sludge when the means on the lower end of the indicator member comes into contact with the upper surface of the sludge with the indicator member and means thereon not capable of being supported by liquid in the septic tank when the indicator member and means on the lower end thereof comes into contact with the liquid thereby enabling the indicator member to be observed at ground level for determining the vertical depth of the accumulated sludge in the bottom of the septic tank.

* * * * *